INVENTORS
JAMES B. COLE
RICHARD H. WEILAND
BY
*Theron H. Nichols*
AGENT

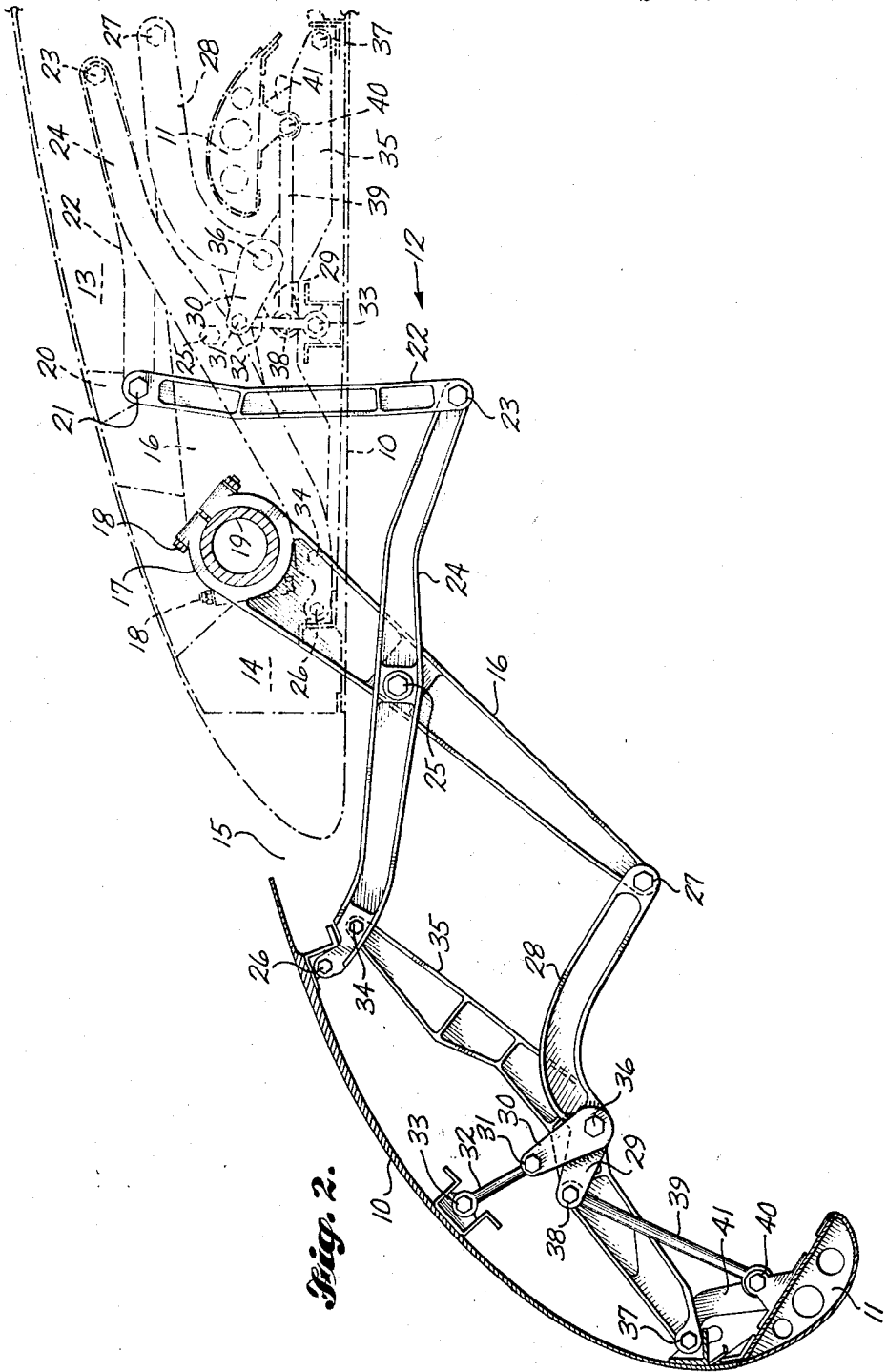

United States Patent Office 3,504,870
Patented Apr. 7, 1970

3,504,870
AIRCRAFT WING VARIABLE CAMBER LEADING EDGE FLAP
James B. Cole, Mercer Island, and Richard H. Weiland, Seattle, Wash., assignors to The Boeing Company, Seattle, Wash., a corporation of Delaware
Filed Dec. 8, 1967, Ser. No. 689,102
Int. Cl. B64c 3/50, 3/48
U.S. Cl. 244—42      19 Claims

ABSTRACT OF THE DISCLOSURE

An airfoil, such as but not limited to, a wing, a flexible panel flap, a nose pivotally connected to one end of the flap, and mechanical linkage for connecting the flap to the wing, the mechanical linkage comprising means being connected to the flap at three spaced apart points for flexing the flap to a flat shape when retracted to form a flat bottom surface of the wing, and the linkage simultaneously retracting and swinging or folding the flap nose more than 90° back over the flap to a position internally of the wing and parallel with the flap to form a sharp nose low drag, high speed cruise wing. Likewise, of greatest importance the mechanical linkage extends and bends the flexible flap to the desired aerodynamically curved shape due to the three points of connection on the flap and the tapering of the flap and spaces it forwardly of the wing to form an aerodynamic slot and simultaneously extends and swings the flap nose outwardly and forwardly more than 90° relative to the flap to form a blunt nose, high lift, low speed wing having increased area, camber, and chord for landings and take-offs.

BACKGROUND OF THE INVENTION

Field of the invention

This invention is classified in class 244, subclass 44, "Airfoils Whose Lift Characteristics Are Varied by a Change in Their Cross-Sectional Contour, at Will or in Response to Changing Conditions."

DESCRIPTION OF THE PRIOR ART

There have been many attempts to change the contour of wings to provide high lift, low drag, low speed airfoil shape for landings and take-offs and yet be changeable back into a high speed contoured wing. Other devices which solve this problem in varying degrees are: Gilmore 1,631,259, June 7, 1927; Quenzler 3,089,666, May 14, 1963; Calderon 3,128,966, Apr. 14, 1964; Calderon 3,195,836, July 20, 1965 and Riedler 3,208,693, Sept. 28, 1965.

None of these patents show the disclosed invention of (1) flexible leading edge flap that is flexed from the flat shape when retracted against the undersurface of the airfoil to an extended, aerodynamically contoured leading edge flap, (2) the contoured flap being spaced from the leading edge to form a slot therewith, and (3) the leading edge flap having an aerodynamically shaped flap nose totally retractable and extendible therefrom, all for providing capability of a high speed wing to be changed to a very high lift, low drag, and low speed wing for landings and take-offs.

SUMMARY OF THE INVENTION

Thus, a variable camber leading edge flap is disclosed herein comprising a flexible flap panel, which when retracted lies flat against the bottom surface of an airfoil, such as the illustrated aircraft wing, for example, and mechanical linkage connected between the wing leading edge and three spaced apart points on the leading edge flap for bending the flap when in the extended position to the desired aerodynamically curved shape from the retracted flat shape. This same mechanical linkage also swings the flap downwardly and forwardly to a position spaced from the wing leading edge to form the desired aerodynamic slot therewith. Further, this same mechanical linkage likewise unfolds an aerodynamically shaped flap nose from the flap leading edge or nose end, all three features providing the wing with the capability of easily converting from a high speed, cruising wing to a very high lift, low drag, low speed wing for landings and take-offs.

Accordingly, a principal object of this invention is to provide a new method for providing the highest aerodynamic performance when converting a high cruise speed wing to a low speed wing for landings and take-offs.

Another principal object of this invention is to provide a flexible leading edge flap for converting a high speed airfoil to a low speed, high lift, low drag airfoil.

A further object of this invention is to provide a flexible leading edge wing flap that is flexed from a flat retracted position against the wing leading edge lower surface to the desired or predetermined aerodynamically curved shape in a position extended from the wing leading edge.

A still further object of this invention is to provide a flexible wing leading edge flap that is extendible from a flat retracted position to the desired aerodynamically curved shape in extended position, and which position is spaced from the leading edge of the wing to form an aerodynamic slot therewith.

Another object of this invention is to provide a leading edge flap having an aerodynamically shaped flap nose unfoldable therefrom to give a wing capabilities of easy conversion from a high speed wing for cruising flight to a very high lift, low drag, low speed wing for landings and take-offs.

Other objects and various advantages of the disclosed Aircraft Variable Camber Leading Edge Flap will be apparent from the following detailed description, together with the accompanying drawings, submitted for purposes of illustration only and not intended to define the scope of the invention, reference being made for that purpose to the subjoined claims.

BRIEF DESCRIPTION OF DRAWINGS

The drawings diagrammatically illustrate by way of example, not by way of limitation, one form of the invention wherein like reference numerals designate corresponding parts in the several views in which:

FIG. 2 is an enlarged, detailed side view of the embodiment of FIG. 1 illustrating schematically in solid lines the new extended flap nose, and actuating linkage, and showing all in retracted position in broken lines.

DESCRIPTION OF THE PREFERRED EMBODIMENTS

Figure 1:
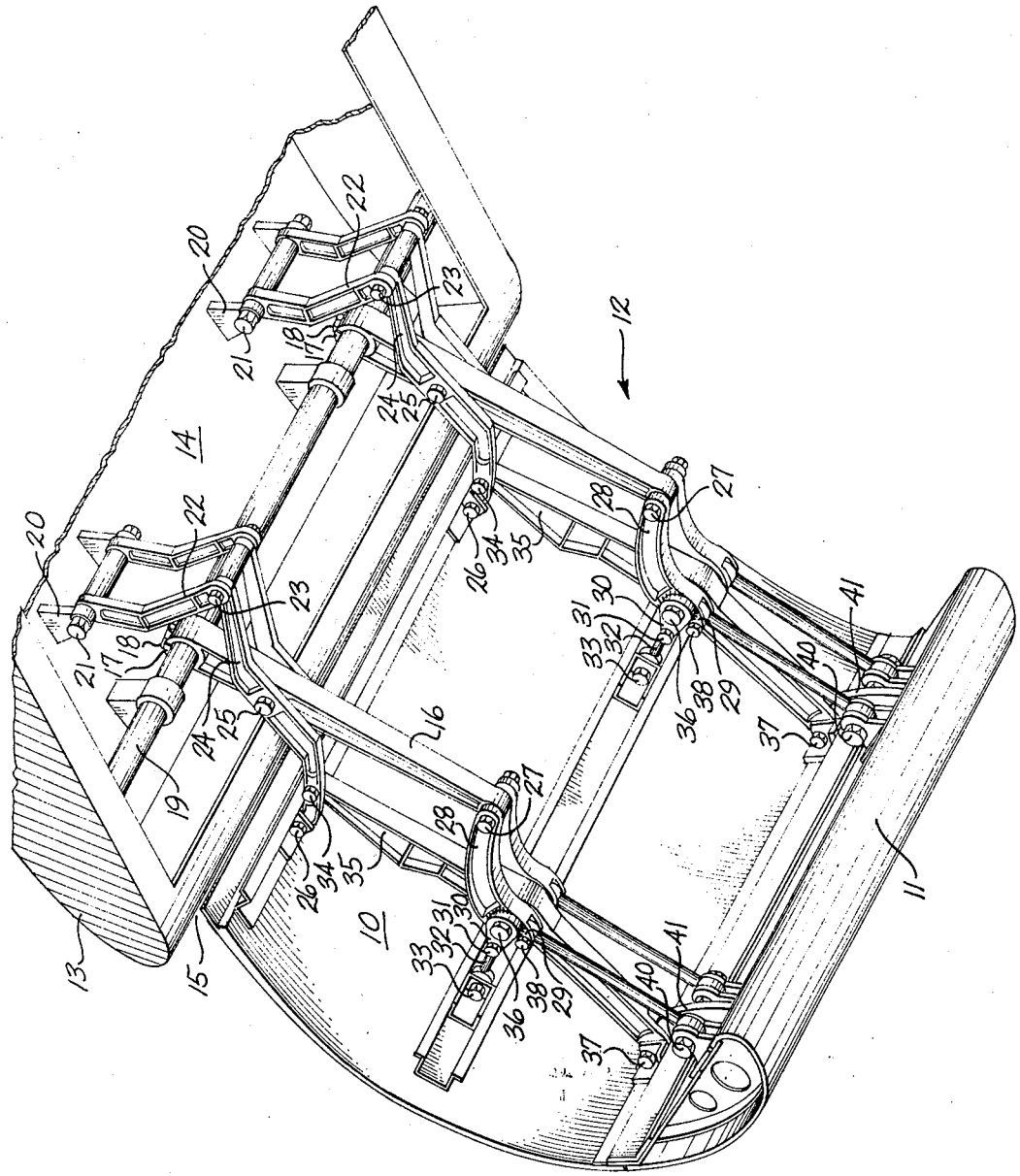
FIG. 1 is a perspective, schematic view from below, of a portion of the aircraft wing, the leading edge flap, the flap nose, and the linkage for bending the flap, unfolding the flap nose, and for forming the slot between the flap and wing, all illustrated in extended position.

The invention, the scope of which being defined in the appended claims, is not limited in its application to the details of construction and arrangement of parts shown and described, since the invention is capable of other embodiments and of being practiced or carried out in various other ways. Also, it is to be understood that the phraseology or terminology employed herein is for the purpose of description and not of limitation.

This invention comprises a new method for increasing the lift of an airfoil, such as but not limited to an aircraft wing having a leading edge flap by:

(1) flexing the flap to the desired aerodynamically curved shape when in extended position, and
(2) flexing the flap to the substantially flat shape of the under-surface of the wing when in retracted position overlying the wing lower skin surface.

Another method or portion of the invention for increasing the lift of an aircraft wing having a leading edge flap is to:

(1) pivotally mount an aerodynamically shaped nose on the leading edge of the flap,
(2) pivot the flap nose forwardly greater than 90° when the flap is in retracted position until the nose overlies the flap, and
(3) pivot the flap nose outwardly to extend the aerodynamic shape of the flap and to form a blunt nose or high lift airfoil when the flap is in extended position.

The flexible flap is made a still higher performer by (4) positioning the flexible flap totally and completely forwardly of the wing leading edge for forming an aerodynamic slot between the wing leading edge and the slot end of the flexible flap when the flap is flexed to the desired or predetermined aerodynamic shape.

The term "leading edge flap" for an airfoil, such as a wing for example, has now acquired the following limiting definition: an aerodynamic surface that is extendible generally forwardly from the *lower surface* of the leading edge of a wing, as contrasted with a "leading edge slat" which is an aerodynamic surface that is extendible generally forwardly from the wing leading edge *upper surface* and spaced therefrom.

The drawings disclose one embodiment for carrying out the new method set forth above.

FIG. 1, a perspective view from below of an airfoil illustrating a portion of the invention on the leading edge of the airfoil, such as but not limited to, an aircraft wing. The invention, a new flexible flap 10 with its flap nose 11 and actuating linkage 12 generally extend along a major portion of the wing leading edge 13 and retractable into a wing cavity 14. Also as clearly illustrated in the figures, the flap 10 is tapered forwardly when in extended position.

FIG. 2, an enlarged detailed side view of the new flexible flap 10, discloses in solid lines how the flap is extended and bent to the desired aerodynamic contour or shape, how the flap nose 11 is unfolded to completed the curvature of the contoured flap, and how the flap is spaced from the wing leading edge 13 to form the desired aerodynamic slot 15 by action of the actuating linkage 12. These are illustrated in broken lines in retracted position.

The first link of the actuating linkage 12, FIG. 2, comprises a support arm 16 having one end 17 split with a bolt 18 therethrough for tightening the split end and fixedly connecting it, as by a spline tooth connection, to a manually controlled torque shaft 19.

Aft of the shaft 19, FIG. 2, is a lug 20 internally of the wing leading edge 13 having a pin 21 pivotally attaching vertical link 22 thereto when in extended position. Pin 23 pivotally connects a substantially horizontal link 24 to the vertical link 22. While the middle portion of link 24 is pivotally attached to the support arm, link 24 continues to the left for supporting and guiding the slot end of flap 10 with pin 26. Link 28, substantially parallel to link 24 in extended position, has its right end pivotally connected to the lower end of the support arm 16 with pin 27 and has two lugs 29 and 30 integral with the left end of link 28. Pin 31 pivotally connects short link 32 to the lug 30 while link 32 is connected with pin 33 to an intermediate portion of the flap 10 for precise control of the aerodynamic shape or curvature thereof.

Pivotally connected to the left end of link 24, FIG. 2, with pin 34 is link 35 which is substantially parallel to support arm 16 in the extended position. While the intermediate portion of link 35 is pivotally connected with pin 36 to an intermedate portion of link 28, the lower end of link 35 is pivotally connected to the nose end of the flap 10 with pin 37.

Connected to lug 29, FIG. 2, with pin 38 is link 39 which in turn is connected to the nose flap 11 with pin 40, pin 37 also connecting the flap 11 through its arm 41 to the flap 10.

FIG. 2 discloses, likewise, in broken lines the linkage in folded position wherein the flexible flap 16 is bent flat in its retracted flush position covering cavity 14 and with nose flap 11 folded forwardly to overlie the retracted flap for a great saving in storage space.

In the preferred embodiment, the leading edge flaps for each wing are divided into five different flaps spaced spanwise of the wings. Another feature of this invention is that the various lugs 20 along the wing are formed with holes for pin 21 positioned at various heights internally of the wing as the camber varies along the lengths of the wing or spanwise to provide the desired slot 15. With the disclosed linkage, the lower pin 21 is mounted, the higher the trailing edge of flap 10 forming the slot is raised.

Thus, a new method for increasing the aerodynamic performance of a wing at both low and high speeds is set forth above. Also is disclosed at least one embodiment for carrying out the method. This embodiment comprises means (1) for extending the flexible flap from a flat, retracted position comprising the undersurface of the wing to a precise aerodynamic, curved shape extending forwardly and downwardly of the wing leading edge, (2) for unfolding the flap nose from a position folded forwardly overlying the wing in a small cavity in the wing to a nose position for completing the airfoil of the curved leading edge flap, and (3) for extending the flap from a retracted position forming a portion of the wing leading edge flat undersurface to a position spaced forwardly of the leading egde forming the desired aerodynamic slot therewith.

Therefore, the new leading edge flap provides the greatest increase in wing area, camber, and chord of any known device. Likewise, a sharp leading edge or nose is provided for forming a high speed wing, and a blunt nose is provided for forming a low speed wing.

While a method and only one embodiment of the invention has been shown in the accompanying specification and drawings, it will be evident that various other modifications are possible in the arrangement and construction of the disclosed aircraft wing variable camber leading edge flap without departing from the scope of the invention and it is accordingly desired to comprehend within the purview of this invention such modifications as may be considered to fall within the scope of the appended claims.

We claim:

1. A new method for increasing the aerodynamic performance of a wing having an extendible and retractable leading edge flap having a flexible portion comprising:

(a) bending the flexible flap portion to a desired predetermined aerodynamically curved shape when extended,
(b) maintaining three spaced apart points on said flexible flap portion in the desired precise predetermined aerodynamically curved shape,
(c) bending the entire flexible flap portion to a desired aerodynamically flat shape when retracted for lying contiguous with the wing lower skin surface, and
(d) maintaining said three spaced apart points on said flexible flap portion in the desired aerodynamically flat shape.

2. A new method for increasing the aerodynamic performance of a wing having an extendible and retractable leading edge flap having a flexible portion comprising:

(a) bending the flexible flap portion to a desired predetermined aerodynamically curved shape when extended, (b) maintaining three spaced apart points on said flexible flap portion in the desired precise predetermined aerodynamically curved shape, (c) pivoting a blunt nose to the leading edge of the flap, (d) pivoting the flap nose outwardly to form a blunt nose high lift airfoil when the flap is in extended position, (e) bending the entire flexible flap portion to a desired aerodynamically flat shape when retracted for lying contiguous with the wing lower skin surface, (f) maintaining said three spaced apart points on said flexible portion in the desired aerodynamically flat shape, and (g) pivoting the flap nose forwardly greater than 90° when the flap is in retracted position.

3. In a method as recited in claim 2 wherein the other end of the flap is the aft positioned slot end when in extended position, the method further comprising:

(a) positioning the flap having a flexible portion completely forwardly of the wing leading edge for forming an aerodynamic slot between the wing leading edge and the slot end of the flap when the flap is extended and the flap portion bent to the desired aerodynamic shape.

4. In an aircraft airfoil having a leading edge flap means and actuating means for said flap means, the improvement comprising:

(a) said flap means having a flexible portion, (b) said actuating means being connected to said flap means at three spaced apart points on said flexible portion, and (c) said flap means flexible portion being responsive to said actuating means for being flexed at said three spaced apart points into a desired aerodynamic curvature for forming a highly cambered high lift, low drag, low speed airfoil.

5. In an aircraft airfoil having a leading edge flap means and means for movably connecting said flap means to said air foil, the improvement comprising:

(a) said flap means having a flexible portion, (b) said connecting means being connected to said flap means at three spaced apart points on said flexible portion, and (c) said flap means flexible portion being responsive to said connecting means for being flexed at said three spaced apart points from a flat shape into a desired aerodynamic curvature for forming a high lift, low drag, low speed airfoil.

6. In an aircraft airfoil having a leading edge flap means and means for movably connecting said flap means to said airfoil, the improvement comprising:

(a) said flap means having a flexible portion, (b) extendible nose means for said flap means, (c) said connecting means being connected to said flap means at three spaced apart points on said flexible portion for flexing said flap means into a desired aerodynamic curvature, (d) said flap means being responsive to said connecting means for extending said flap nose means for forming a blunt leading edge on said flap means, and (e) said flap means being responsive to said connecting means for being positioned in spaced relationship with said airfoil for forming an aerodynamic slot therewith and accordingly a low drag, high lift, low speed aircraft airfoil for landings and take-offs.

7. In an aircraft airfoil having a leading edge flap means and actuating means connected to said flap means at three spaced apart points for flexing said flap means and for retracting and extending said flap means from the airfoil, the improvement comprising:

(a) said flap means having a flexible portion, (b) retractable and extendible flap nose means for said flap means, (c) said flap means flexible portion being responsive to said actuating means for being flexed at said three spaced apart points from a flat configuration retracted in said airfoil to an aerodynamically curved configuration extended from said aircraft airfoil and spaced from said airfoil for forming an aerodynamic slot therewith, and (d) said flap nose means being responsive to said actuating means for being pivoted greater than 90° from a position retracted in said airfoil overlying said flap means to a position extended from said flap nose for increasing the camber, area, and chord of said aircraft airfoil.

8. In an aircraft wing having a leading edge flap means and means for retracting and extending said flap means from the leading edge lower surface of said wing, the improvement comprising:

(a) said flap means having a flexible portion, (b) said retracting and extending means comprising means connected to said flap means at three spaced apart points on said flexible portion for bending said flap means, and (c) said flap means flexible portion being responsive to said bending means for being bent at said three spaced apart points to a desired aerodynamic shape when extended for converting from a high speed, low camber wing to a high lift, high camber, low drag, low speed wing for landings and take-offs.

9. In an aircraft wing as recited in claim 8, wherein:

(a) said flap means flexible portion is responsive to said bending means for being bent at said three spaced apart points to a flat shape for forming a flat bottom surface of said wing when retracted for forming a low drag, low camber, high speed wing.

10. In an aircraft wing as recited in claim 9 wherein said wing comprises:

(a) retractable and extendible nose means for said flap means, (b) said nose means being responsive to said bending means for being extended when said flap is bent, to form a blunt nose, high lift, low speed wing for landings and take-offs.

11. In an aircraft wing as recited in claim 10 wherein:

(a) said bending means comprises linkage connected between said wing leading edge and three point on said flap means flexible portion, (b) said linkage comprising means for bending said flexible flap means at said three spaced apart points into said desired aerodynamic shape when extended, and (c) said linkage comprising means for extending said flap nose when said flap is extended to form said blunt nose, high lift, low speed wing, and for retracting said flap nose means greater than 90° relative to said flap means when said flap is retracted into said wing lower surface.

12. In an aircraft wing as recited in claim 9 wherein said wing comprises:

(a) retractable and extendible nose means for said flap means, (b) said nose means being responsive to said bending means for being retracted greater than 90° relative to said flap means when said flap is retracted into the lower surface of said wing for requiring less space in said wing.

13. In an aircraft wing as recited in claim 9 wherein:

(a) said flap means is responsive to said bending means for being spaced completely forwardly of said wing leading edge to form an aerodynamic slot therewith when said flap means is extended.

14. In an aircraft wing as recited in claim 13 wherein:

(a) said means for retracting and extending said flap means being mountable at various heights internally and spanwise of the wing for forming the desired aerodynamic slot at various cambered portions of the wing in a spanwise direction.

15. In an aircraft wing having a leading edge flap means and linkage means for retracting and extending said flap means from the wing leading edge lower surface, the improvement comprising:
   (a) said flap means having a flexible portion,
   (b) said linkage means comprising means connected to said flap means flexible portion at three spaced apart points on said flexible portion for flexing said flap means,
   (c) retractable and extendible nose means for said flap means, and
   (d) said flap means flexible portion being responsive to said linkage means when said flap means is extended, for being flexed at said three spaced apart points into a desired aerodynamic curvature, for extending said flap nose means forwardly of said curved flap means, and for spacing said flap means completely forwardly of said wing leading edge to form a desired aerodynamic slot therewith for forming a blunt nose, high lift, low drag, low speed wing for landings and take-offs.

16. In an aircraft wing having a leading edge flap means and linkage means for retracting and extending said flap means from the wing leading edge lower surface, the improvement comprising:
   (a) said flap means having a flexible portion,
   (b) said linkage means comprising means connected to said flap means flexible portion at three spaced apart points on said flexible portion for flexing said flap means,
   (c) retractable and extendible nose means for said flap means, and
   (d) said flap means flexible portion being responsive to said linkage means when said flap means is retracted, for being flexed at said three spaced apart points from a curved surface to a flat surface for forming a portion of the flat undersurface of said wing leading edge, and for retracting said flap nose by pivoting said flap nose forwardly on said flap means greater than 90° relative to said flap means for requiring a minimum of space in said wing and for converting said wing from a highly cambered, low speed wing to a low cambered, streamlined, high cruise speed wing.

17. In combination with an airfoil having a leading edge and a lower surface having means defining a flap-receiving recess therein, a variable camber flap assembly comprising,
   (a) a flexible flap member having a leading edge and a trailing edge,
   (b) power operable linkage means connected between said airfoil and said flexible flap member at three spaced apart points for swinging said flap member between a retracted position wherein it is disposed in said flap-receiving recess in said airfoil lower surface and forms a generally flat, flush surface with said lower surface, and an extended position wherein said flap member forms a convexly-curved, high-lift aerodynamic surface with said flap member leading edge extending forwardly of said airfoil leading edge and said flap member trailing edge being spaced forwardly of said airfoil leading edge, and
   (c) said power operable linkage means comprising means for bending said flap member into said convexly-curved, high-lift, aerodynamic shape as it swings said flap member from said retracted position to said extended position.

18. An aircraft wing having a leading edge comprising:
   (a) retractable leading edge flap means for said wing, said flap means having a flexible portion and having a nose end and a slot end,
   (b) nose means for the nose end of said flap means,
   (c) actuatable means for said wing connected to said flap means at three spaced apart points on said flexible portion,
   (d) said flap means flexible portion being responsive to said actuatable means for retracting said flap means flexible portion to a flat configuration forming a flat undersurface of the wing leading edge,
   (e) said nose means being responsive to said actuable means for being folded into an overlying position with said retracted flap means for forming a high speed wing,
   (f) said flap means flexible portion being responsive to said actuatable means for being flexed at said three spaced apart points to a desired aerodynamic curvature and extended to a position spaced forwardly of said wing leading edge for forming a slot between said curved flap means and said wing leading edge, and
   (g) said nose means being responsive to said actuating means for being unfolded to a position for completing the contour of the curved flap means for forming an aircraft low speed blunt wing of increased camber, of increased area, of increased chord, and having greater lift for landings and take-offs.

19. In an aircraft airfoil having a leading edge flap means and actuating means for said flap means, the improvement comprising:
   (a) said flap means having a flexible portion,
   (b) the major portion of said flexible portion being tapered forwardly in extended position,
   (c) said actuating means being connected to said flap means at three spaced apart points on said flexible and tapered portion, and,
   (d) said flap means flexible and tapered portion being responsive to said activating means for being flexed at said three spaced apart points into a desired aerodynamic curvature for forming a highly cambered, high lift, low drag, low speed airfoil.

References Cited

UNITED STATES PATENTS

| 2,755,039 | 7/1956 | Davie | 244—42 |
| 2,912,190 | 11/1959 | MacDonough | 244—44 |
| 3,089,666 | 5/1963 | Quenzler | 244—42 X |
| 3,109,613 | 11/1963 | Bryant et al. | 244—44 |
| 3,128,966 | 4/1964 | Alvarez-Calderon | 244—42 |
| 3,195,836 | 7/1965 | Alvarez-Calderon | 244—42 |
| 3,203,647 | 8/1965 | Alvarez-Calderon. | |
| 3,246,335 | 4/1966 | Alvarez-Calderon. | |

OTHER REFERENCES

German printed application, 1,120,280, Dornier-Werke, Dec. 21, 1961.

Aviation Week and Space Technology, Nov. 20, 1967, pp. 62–63.

MILTON BUCHLER, Primary Examiner

JEFFREY L. FORMAN, Assistant Examiner

U.S. Cl. X.R.

244—44